Nov. 29, 1949 A. R. BARTH 2,489,737
MOLDING MACHINE FOR MAKING CONCRETE BUILDING TILE
Filed Sept. 12, 1946 4 Sheets-Sheet 4
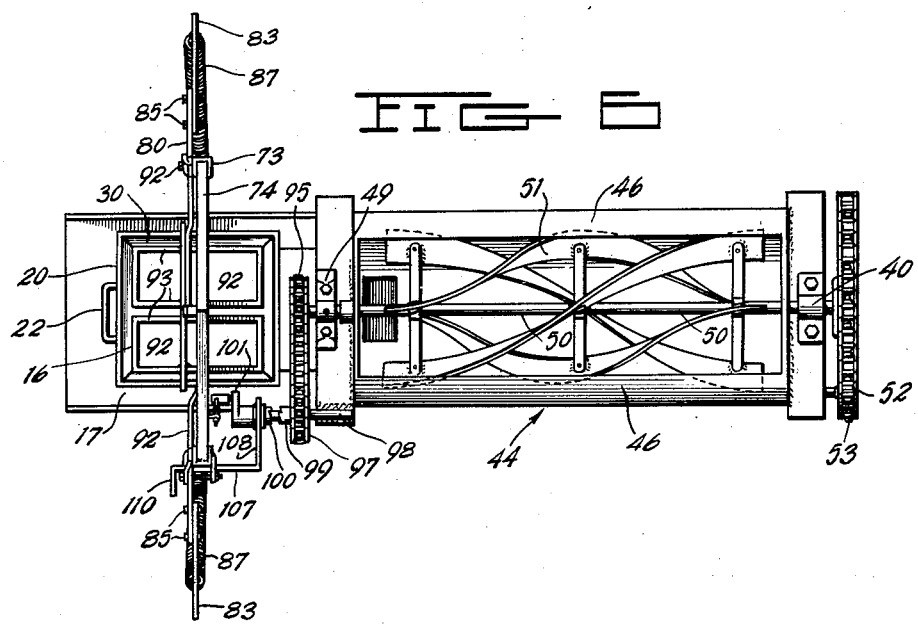
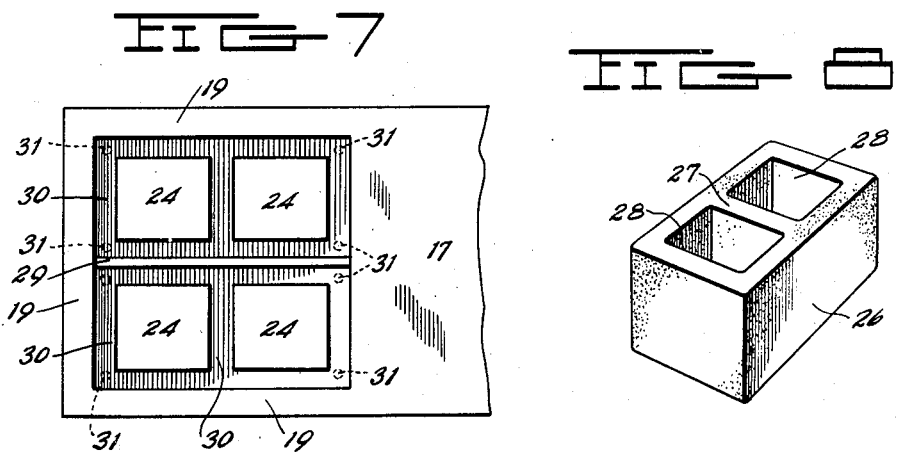
Inventor
Albert R. Barth
By Clarence A. O'Brien
and Harvey B. Jacobson
Attorneys Patented Nov. 29, 1949

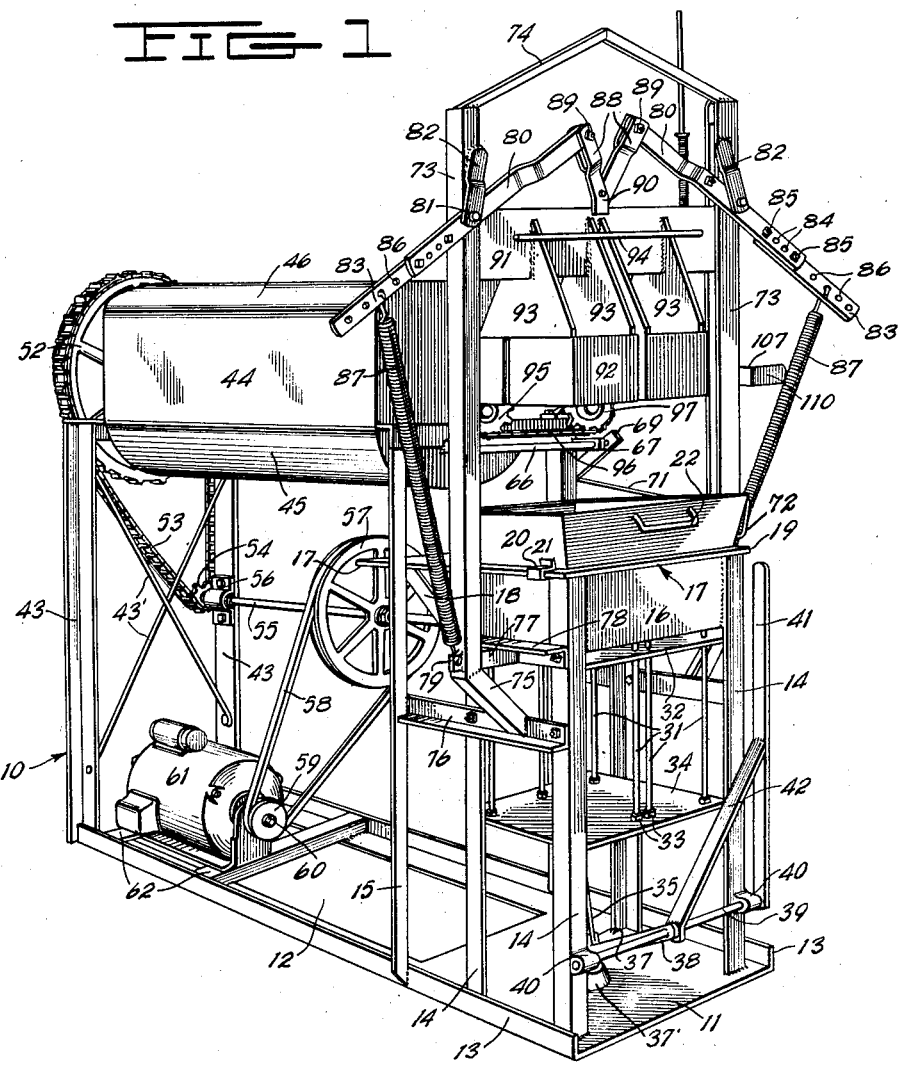

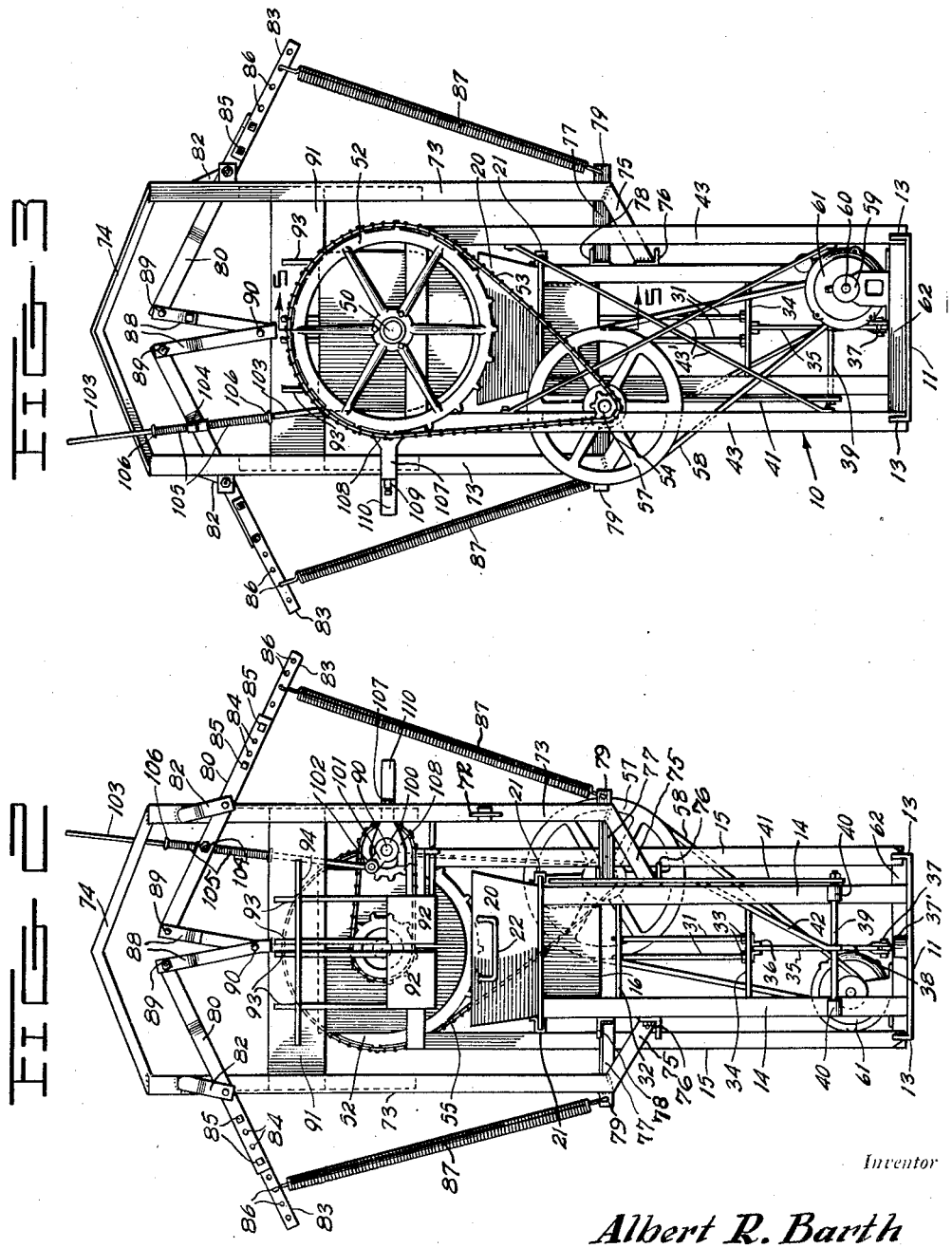

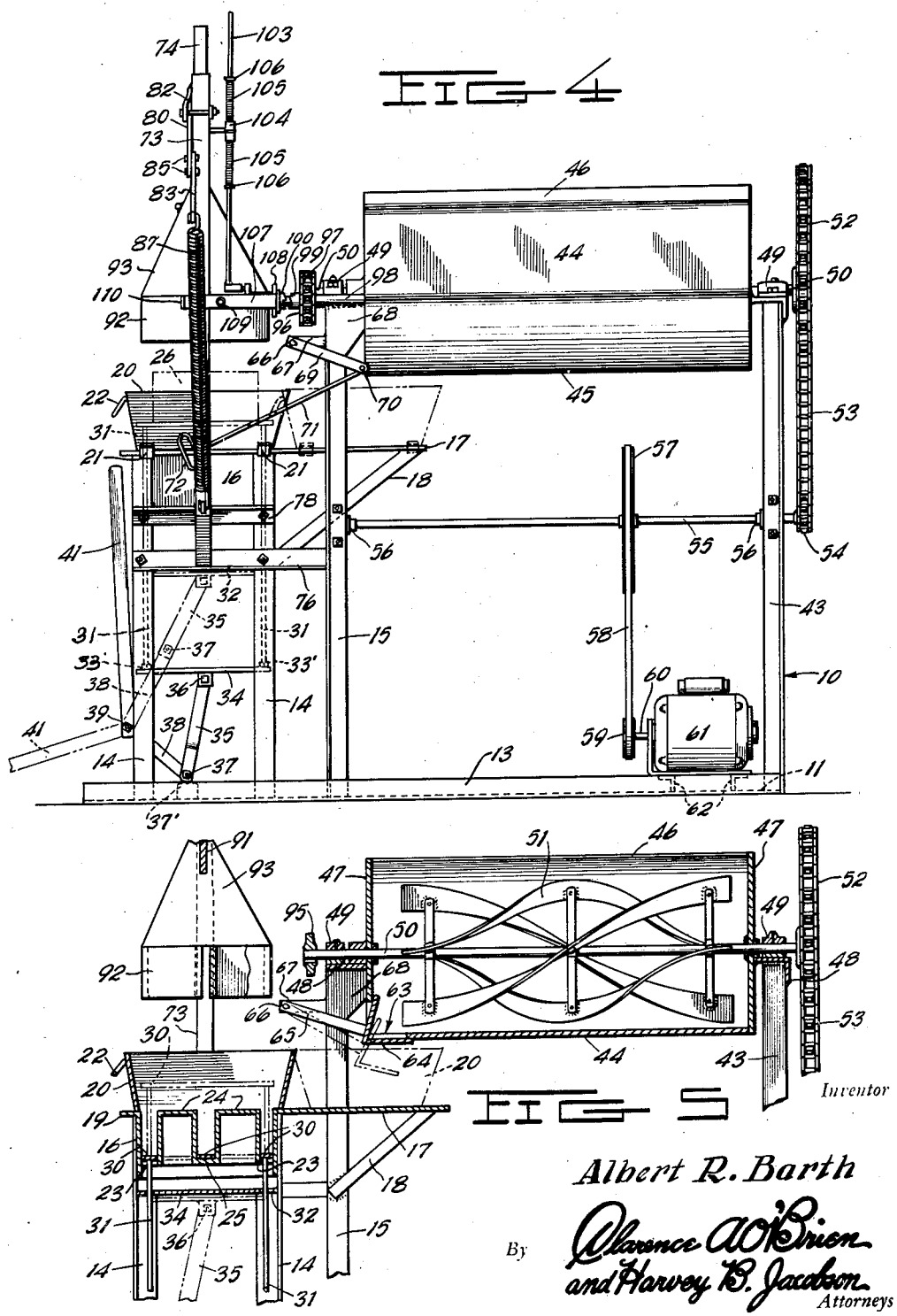

2,489,737

UNITED STATES PATENT OFFICE 2,489,737

MOLDING MACHINE FOR MAKING CONCRETE BUILDING TILE

Albert R. Barth, San Angelo, Tex.

Application September 12, 1946, Serial No. 696,542

1 Claim. (Cl. 25—41)

This invention relates to a machine for making building blocks and more particularly concrete hollow tile for building purposes.

The object of the invention is to provide a complete machine including a mixer in which the gravel, sand, cement and water are deposited in the required and proper correct proportions to be thoroughly mixed by paddles driven by a motor mounted on the frame of the machine and provided with a movable hopper into which the concrete mixture is discharged for depositing the same in a mold box in which the hollow tiles are formed and tamped to compress the same in the required form, after which the hollow tiles are ejected from the mold box to a raised position for removal, drying and setting, novel operating means being provided for the tampers in vertical guides having shock absorbing means with means for intermittently connecting and disconnecting the tamping means for downward movement to tamp or compress the mixture in the mold and means for elevating the tampers to an inoperative position.

Another object of the invention is to provide a machine for completely producing the hollow tile or building blocks, including the mixing of the concrete mixture, as well as novel means for normally holding the tampers in an elevated position so that they may be moved downwardly to tamp or compress the concrete mixture in the mold and for automatically raising the tampers after the hollow tile have been completed, so that the tampers are always in position to be lowered into operative or tamping position, in conjunction with means for ejecting the tile from the mold box after being formed.

Another object of the invention is to provide a hollow tile concrete block machine which is comparatively compact, rigid and strong, and suitable for being transported from place to place, so as to quickly and efficiently turn out concrete hollow tile blocks for building purposes.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of a machine for making concrete hollow tiles for building purposes in accordance with the invention;

Figure 2 is a front elevation thereof;

Figure 3 is a rear elevation of the machine;

Figure 4 is a side elevation;

Figure 5 is a vertical sectional view taken on the line 5—5 of Figure 3;

Figure 6 is a top plan view;

Figure 7 is an enlarged detail plan view of the platform for supporting the movable hopper, and mold ducts beneath, and Figure 8 is a perspective view of a hollow tile or building block produced by the machine.

By referring to the drawings in detail, in which like reference characters designate corresponding parts throughout the several views, the machine is shown as comprising a frame 10 including a base 11 comprising a plate having a central opening 12 forming supporting portions at the ends of the base, which is further provided with up-turned side flanges 13 at the longitudinal edges thereof. At the front end, upright corner posts 14 of angle iron, which in connection with upright posts 15 rearwardly thereof and extending above the upright posts 14, a mold box 16 of rectangular form in plan, is fixed so that the top of the mold box is in line with a horizontal table or platform 17 supported by braces 18 at its rear extension, in conjunction with the upright posts 15 and forms and outwardly directed horizontal flange 19 at the front and sides of the mold box. A hopper 20 with inclined sides tapering downwardly and open at the top and bottom is slidably engaged with the side flanges 19 at the bottom of the hopper by means of grooved guides 21 and the open ended hopper is provided at the front with a handle 22 by which it may be moved from over the mold box back over the platform 17 and vice-versa, or forwardly over the mold box. The mold box 16 is open at the bottom, but is provided with a partition having a surrounding depressed portion 23 fitting snugly at the inside of the mold box and having spaced raised portions 24 forming cores of rectangular outline and producing a transverse depressed portion 25 therebetween designed to form a tile 26 of hollow construction as employed in connection with building blocks as shown in Figure 8 of the drawings, with a transverse connecting wall 27 with openings 28 therethrough, formed by the raised portions or cores 24. The mold box is designed to produce two of such tiles or building blocks at one time, and is provided with a longitudinal dividing wall 29 separating the two mold compartments at the bottom of which similarly shaped pallets 30 are provided to move vertically therein on which the hollow tiles or building blocks are formed and by which they are adapted to be raised or ejected from the mold in a manner to be later described.

Vertical rods 31 connect to the pallets 30 and operate through holes in the depressed portion 23 and an apertured horizontal guide plate 32 held in the upright corner posts 14 below the mold box 16, and extend downwardly for adjustable connection at 33 through holes in a movable horizontal guide plate 34 movable at its corners, within the upright corner posts 14 of angle iron. A link 35 is pivotally connected at 36 centrally to the bottom of the guide plate 34 by means of a pivot bracket or apertured ears and has its lower end which is preferably forked and apertured, pivotally connected at 37 to a link or arm 38 of a bell crank lever fixed to a horizontal pivot shaft 39 mounted to turn at its ends in bearings 40 on the forward upright corner posts 14 to be turned by an operating lever 41 braced as at 42 to the shaft 39, to which one end of the lever 41 is fixed and forming a part of the bell crank lever extending diagonally from the center of the shaft to the lever.

At the rear portion of the base 11, the frame 10 has upright corner posts 43 and the upper ends of the upright posts 15 and 43 support a horizontal hopper 44 having a concave bottom 45 and inturned side flanges 46 at the top and ends 47 mounted on brackets 48 at the upper ends of the uprights 15 and 43, with bearings 49 for a horizontal mixer shaft 50 having suitable paddles 51 fixed thereto and adapted to turn within the hopper in which is deposited the correct amount of material, such as gravel, sand, cement and water in correct proportions to be mixed. The shaft 50 is designed to be driven in any suitable manner, and as shown, is provided with a rear large fixed sprocket wheel 52 driven by an endless drive belt or chain 53 from a small sprocket wheel 54 fixed to the rear end of a horizontal counter-shaft 55 journaled at one side of the frame 10 in bearings 56 carried by the uprights 15 and 43 at said sides. The shaft 55 carries a fixed pulley 57 engaged by a belt 58 disposed around a pulley 59 on one end of the rotor shaft 60 of a motor 61, preferably a variable speed electric motor mounted on the base 11 at the back of the machine such as through the medium of cross bars 62 extending between the side bars or flanges 13 on the bottom plate of the base. In this way, the paddles are designed to be driven at the desired speed.

At the front, the hopper 44 of the mixer is provided with a discharge opening 63 through which the mixture is designed to be discharged into the hopper 20 when the latter is moved back or rearwardly over the platform 17 from the mold box 16 to the dotted line position shown in Figure 5 of the drawings for receiving the mixture. The discharge opening 63 is designed to be closed normally by a door 64 shown in angular form and adapted to be tilted downwardly, although it may be of any other suitable construction. The door 64 is connected to an arm 65 rigid with a shaft 66 horizontally journaled in outstanding bearing arms 67 at the front or spout end of the hopper at webs or plates 68 at the upper end of the upright posts 15 and having a fixed lever 69 at one end extending downwardly and rearwardly for pivotal connection at the free end thereof as indicated at 70, to the upper rear end of an operating rod 71 slidably mounted on one side of the frame and provided with a handle 72 at its forward end, for manipulating the door 64 to open and close the same.

Disposed outwardly of opposite sides of the frame 10 equi-distantly between the forward corner posts 14 and uprights or posts 15 in line with the rear posts or uprights 14 are vertical inwardly opening channel guides 73 connected and braced at the top by an arch member 74 and having their lower ends directed inwardly and downwardly as indicated at 75 for connection with horizontal cross-members or braces 76 connected at the sides of the uprights or posts 14 and 15 to give support thereto. Additional braces 77 are provided between the guides 73 and similar angle iron braces 78 above the braces 76 and parallel thereto, connecting the posts or uprights 14 at each side and provided with apertured ears 79 extending outwardly therefrom. Adjustable levers 80 are pivoted at 81 in brackets 82 on the guides 73 near their upper ends for vertical swinging movement on the horizontal pivots, the outer arms of the levers having adjustable extensions 83 to adjust the lengths of the arms through the medium of a series of spaced apertures 84 and fastenings or bolts 85 connecting the levers and extensions. The extensions 83 are provided with a plurality of spaced holes 86 for adjustable connection therewith of the upper ends of tamper lifting springs 87 which have their lower ends anchored in the apertured ears 79, so as to vary the tension and leverage on the levers 80. Links 88 having forked upper ends pivotally connected to the forwardly off-set inner arms of the levers 80 as indicated at 89, the links 88 being pivotally connected at 90 in divergent relation, to a cross-member 91 slidable vertically at its ends in the guideways formed by the channels of the vertical guides 73. Spaced tampers 92 are carried by the cross-member 91 to fit the mold box cavities and are mounted on the lower ends of spaced parallel triangular hanger plates 93 anchored at their tapered upper ends in slots and the cross-member 91 and held in fixed spaced relation by a reinforcement rib or brace 94 at their front edges, so that the tampers 92 may pass through the hopper 20 to enter the cavities of the mold box 16.

In order to actuate the tampers, which are normally held raised by the tension of the springs 87, the forward end of the mixer shaft 50 is provided with a sprocket wheel 95 fixed thereto and engaged by a chain 96 disposed around a sprocket wheel 97 loose on a shaft 98 fixed to the plates 68 at the upper end of upright 15 at one side of the machine and frame and having a tub provided with a clutch sleeve 99 designed to be engaged by a sliding clutch sleeve 100 also loose on the end of the shaft 98 and provided with a crank 101. The crank 101 is pivotally connected at 102 to the lower end of a shock absorber connection between the same and one of the levers 80, at the lower end of a rod 103 through the medium of a swiveled sleeve 104 through which the rod 103 extends, the sleeve being swiveled to the lever 80 and having springs 105 on the rod 103 on opposite sides of the sleeve held in tension by adjustable collars or stops 106 on the rod 103, so as to operate the levers 80 and act as a shock absorber by cushioning the throw and movements thereof with the crank as the latter is rotated, to reciprocate the tampers up and down in the mold cavities. The sliding clutch member 100 is slid back and forth through the medium of a lever 107 having a fork 108 at one end engaging in a groove of the clutch member or sleeve 100 and slidably or pivotally mounted on a spring cushioned pin 109 on the adjacent guide 73 and having an out-turned end 110 forming a handle for actuating the lever to engage and disengage the clutch for operatively connecting and disconnecting the tampers to the driving means.

In the operation of the machine as described, the concrete mixture of gravel, sand, cement and water in correct proportions is deposited in the mixer and thoroughly mixed by operation of the motor 61 to drive the paddles 51 through the medium of the belt 58 and chain 53 to drive the shaft 50. When the concrete is then properly mixed, the hopper 20 is slid on the platform 17 from the solid line position shown in Figure 5 to the dotted line position shown therein under the discharge opening or spout of the mixer. The door 64 is then opened by pushing rearwardly on the rod 71 through the medium of the handle 72, to open the door and discharge the concrete mixture in the hopper upon the platform or table 17. The door 64 is then closed and the hopper moved forwardly over the mold box to allow the concrete mixture to drop into the mold cavities through the open bottom of the hopper. The lever 107 is then shifted to connect the clutch member 100 with the clutch member 99 to drive the crank 101 through its shock absorbing connection with the levers 80, to cause oscillation of the latter and reciprocation of the tampers 92 to force the concrete mixture into the mold cavities and tamp or pack the same tightly therein. When this has been completed, the clutch through the crank 101 is disconnected, the springs 87 serving to raise the levers 80 at their inner ends by downward pull on the outer arms of the levers at the extensions 83. The tampers are shown on the upstroke and with the hopper 20 move rearwardly in receiving position beneath the mixer, the lever 41 is swung forwardly and downwardly and through the articulated link connection thereof at 35 and 38, with the plate 34, the rods 31 will be elevated to raise the pallets 30 to move upwardly in the mold box cavities to raise the hollow tile or building blocks 26 thereon in the manner shown in dotted lines in Figures 4 and 5 of the drawings so as to make and eject two of the hollow tiles or building blocks at a time. The tiles are then removed for stacking. It will thus be seen that I have provided a very compact, strong, rigid and efficient machine for making concrete hollow tile or building blocks for building purposes, which may be conveniently operated by a single person from the front of the machine once the motor is started to efficiently and quickly turn out the tile for economical building purposes in the manner described.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

A machine for making hollow concrete tile or building blocks comprising a frame and a mold box mounted on the machine, tampers having a cross-member secured in said frame, a pair of levers secured to said frame, tension means secured to said levers and urging said tampers into inoperative position, a pulley-driven shaft, a clutch member having a crank connectible with the driving shaft, lever means to operate the clutch to reciprocate the tampers, and means for cushioning the movements of the levers mounted on said levers.

ALBERT R. BARTH.

REFERENCES CITED

The following references are of record in the file of this patent:

UNITED STATES PATENTS

| Number | Name | Date |
| --- | --- | --- |
| 1,258,237 | Monroe | Mar. 5, 1918 |
| 1,605,600 | Metz et al. | Nov. 2, 1926 |
| 1,718,338 | Dunn | June 25, 1929 |
| 1,767,197 | Babbitt | June 24, 1930 |
| 1,882,681 | Abram | Oct. 18, 1932 |
| 1,946,708 | Muenzer | Feb. 13, 1934 |

FOREIGN PATENTS

| Number | Country | Date |
| --- | --- | --- |
| 314,935 | Great Britain | July 5, 1929 |